Aug. 1, 1944.  M. GOTTLIEB  2,354,992
GEAR PUMP
Filed Nov. 11, 1941
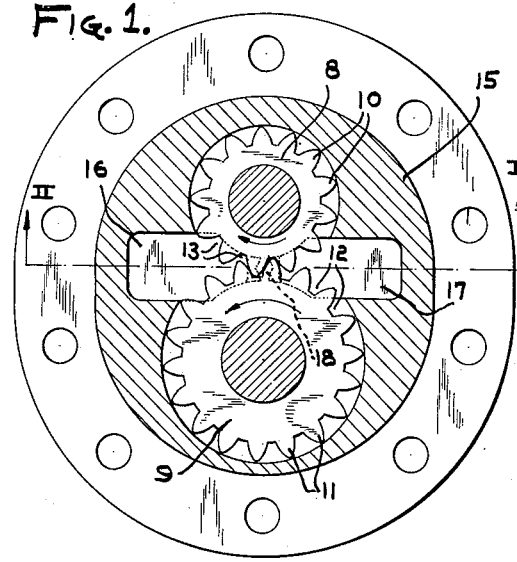
Fig. 1.
Fig. 2.
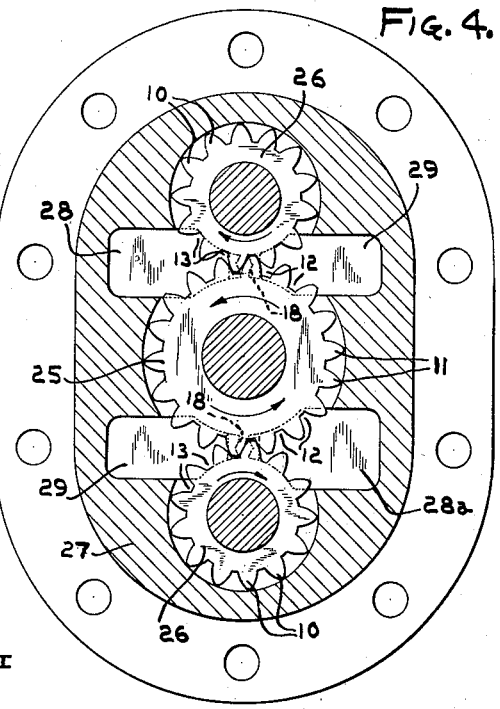
Fig. 4.
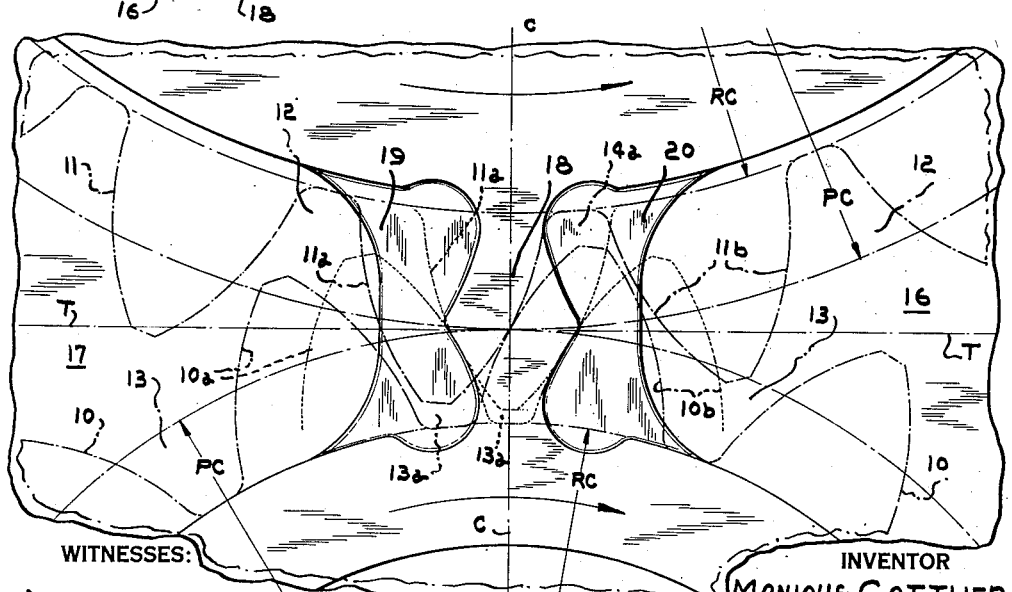
Fig. 3.
WITNESSES:
James K. Mosser
E. H. Lutz
INVENTOR
MANIOUS GOTTLIEB.
BY
A. B. Renwick
ATTORNEY Patented Aug. 1, 1944

2,354,992

UNITED STATES PATENT OFFICE 2,354,992

GEAR PUMP

Manious Gottlieb, Philadelphia, Pa., assignor to Westinghouse Electric & Manufacturing Company, East Pittsburgh, Pa., a corporation of Pennsylvania Application November 11, 1941, Serial No. 418,623

3 Claims. (Cl. 103—126)

The invention relates to gear pumps and it has for an object to relieve the housing at at least one end of the meshing gears to effect quieter operation, to reduce shocks and operating stresses, and to secure operation at higher efficiency.

Considering a tooth on one gear and a cooperating tooth space on the other, during the meshing period and at high speeds, the tooth may be regarded as a piston and the space as a chamber therefor. At the start of meshing, liquid is blocked in the chamber space by the tooth and pressure may be brought up to very high values due to rapid reduction in volume until maximum meshing depth is reached at the line of centers of the gears. From the line of centers, the tooth moves outwardly from the bottom of the tooth space until demeshing occurs; and, during this time, a void of increasing volume is created, thereby producing a cavitation or vacuum condition at the suction side of the pump. These varying pressure conditions occurring during enmeshing and demeshing phases of the meshing period are responsible for noisy operation, undue wear and possible breakage and loss of power, these objections becoming more and more acute as the speed is increased, because the same tooth space volume must be displaced in a shorter time. In many cases it is desirable to make the pump as small as practicable to handle a given volume, and this may be done only by increasing the speed. Therefore, the interior of the pump housing is so relieved at the ends of the gears as to avoid excessive pressure changes in the tooth spaces during enmeshing and demeshing phases of the meshing period. Furthermore, for mechanical reasons, particularly where the pump is of the high-speed type, it is desirable to use teeth having a fairly large pressure angle, for example of the order of 30°, but, as the pressure angle is made larger, the aforementioned displacement difficulties become more acute. To avoid these difficulties, the land at at least one end of the gears is relieved so as to provide relief spaces communicating, at one side, with the suction chamber and, at the other side, with the discharge chamber; and relief is provided in such a way that the land at opposite sides of the tangent to the pitch circles at the point of tangency of the latter conforms approximately to the tooth spaces of the gears extending from the pitch circles to the root circles thereof. Therefore, until such a land is in approximately lapping relation with respect to a tooth space when a tooth and its cooperating space are about symmetrical with the line of centers, relief is provided, relief being to the discharge chamber during the enmeshing phase and to the suction chamber during the demeshing phase. A further object of the invention is to provide a gear pump having these improved features of construction to provide for the mode of operation indicated.

A further object of the invention is to provide a gear pump wherein an intermediate gear meshes with a plurality of other gears together with a housing cooperating with the gears and defining suction and discharge chambers for each pair of meshing gears, one of the chambers being exposed to a larger arcuate extent of the adjoining gears than any of the other chambers in order that a pressure bias may be exerted on the intermediate gear to avoid creeping or wandering of the latter.

These and other objects are effected by the invention as will be apparent from the following description and claims taken in connection with the accompanying drawing, forming a part of this application, in which:

Fig. 1 is a sectional view of the improved gear pump;

Fig. 2 is a sectional view taken along the line II—II of Fig. 1;

Fig. 3 is an enlarged detail view of the improved feature; and,

Fig. 4 shows an alternative form of pump.

Referring to Fig. 1, there is shown a pair of meshing gears 8 and 9 having teeth 10 and 11 cooperating with the tooth spaces 12 and 13, respectively. A housing 15 encloses the gears and it is provided with suction and discharge chambers 16 and 17 disposed in proper relation with respect to the meshing region of the gears.

The housing 15 is provided on its interior with lands separating the suction and discharge chabers 16 and 17, and at least one of these lands 18, or preferably both as shown, is relieved so as to avoid excessive increase in pressure during enmeshing phases and excessive decreases in pressure during demeshing phases. Preferably, this result is effected by providing a land 18 conforming approximately to the profiles of the tooth spaces of the respective gears from the pitch circles PC to the root circles RC thereof, that is, the land has approximately a maximum width at the tangent T—T to the pitch circles at the point of tangency of the latter and converges from the tangent in opposite directions to conform approximately to tooth profiles of the tooth spaces from the pitch circles to the root circles of the gears.

By having lands 18 constructed as just pointed out, it will be apparent that relief spaces 19 and 20 are provided at the ends of the gears and which communicate with the tooth spaces and with the suction and discharge chambers until the lapping relation occurs, at which time a tooth and its cooperating space are approximately symmetrical with the line of centers C—C of the gears. Thus, it will be seen that the spaces 18 assure that any liquid blocked in tooth spaces during enmeshing phases may flow outwardly therefrom to the discharge chamber, thereby preventing the building up of excessive pressures; and the relief space 20 at the other side of the land prevents the occurrence of a vacuum or cavitation condition, flow occurring from the discharge chamber to the tooth space as the volume of the latter increases.

The relation of the lands 18 and the gears 8 and 9 will be clearer upon reference to detail Fig. 3. The land 18 is shown in full lines; one position of the teeth in relation to the land is shown in dot-and-dash lines; and another position of the teeth is shown in dotted lines. In all positions of the meshing teeth, the lands 18 cooperate therewith to separate the suction and discharge chambers. Designating the meshing teeth of Fig. 3 as 10a, 10b, 11a, and 11b, and the tooth spaces as 13a and 14a, when the teeth are in the dot-and-dash position, the contacting teeth 11a and 10b engage the lands to separate the suction and discharge spaces. With the gears moving in the directions indicated, the tooth 11a moves inwardly of the space 13a to diminish the clearance volume thereof and the tooth 10b moves outwardly of the space 14a to increase the clearance volume thereof; however, as the relief spaces 20 and 19 establish communication of the contracting and expanding clearance spaces with the discharge and suction spaces 17 and 16, respectively, pressure and vacuum conditions in the clearance spaces are avoided. When the teeth 10a, 11a, and 10b reach the dotted line position, the lands 18 cooperate therewith to separate the suction and discharge chambers and the lands lap the portion of the tooth space 13a from the pitch circle PC to the root circle RC of the gear 8.

Thus, it will be seen that the tooth spaces communicate with the suction and discharge chambers except when they are symmetrically disposed with respect to the line of setters CC of the gears, at which time they are lapped by the lands 18; and, as the clearance volume of a tooth space is a minimum and change thereof is not appreciable while lapping occurs, only a very slight movement being required to interrupt communication of the clearance space 13a with the relief space 20 to establish the lapped relation and only slight continued movement being required to break the lapped relation and place the tooth space in communication with the relief space 19, neither a pressure nor a vacuum condition can be developed during the lapping phase.

In Fig. 4, there is shown a pump wherein an intermediate gear 25 meshes with a plurality of other gears 26. A housing 27 cooperates with the gears and provides suction chambers 28 and 28a and discharge chambers 29 for the meshing regions of each of the gears 26 and the intermediate gear 25. The housing has lands cooperating with each pair of meshing gears to prevent the excessive building up of pressure and creation of vacuum conditions, as already pointed out. With the arrangement shown, it will be apparent that pressures applied to the intermediate gear 25 will be balanced and the latter would tend to float or wander unless biased in some way. Therefore, one of the chambers, for example, a suction chamber 28a is arranged so as to be exposed to a larger arcuate extent of the meshing gears than is the case with respect to the other chambers. Therefore, the intermediate gear will no longer be in a state of indefinite equilibrium but pressure bias will be applied thereto, tending to prevent any wandering or creeping effect thereof.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a gear pump, a pair of meshing gears, a housing cooperating with the gears and providing suction and discharge chambers, and lands provided on the interior of the housing and cooperating with the ends of the gears to separate the suction and discharge chambers, the land at at least one end of the gears being disposed symmetrically with respect to the line of centers of the gears and conforming approximately to the combined profiles of the portions of the tooth spaces of the respective gears extending from the pitch circles to the root circles thereof.

2. In a gear pump, an intermediate gear, a plurality of other gears meshing with the intermediate gear, a housing cooperating with the gears and providing suction and discharge chambers at opposite sides of the meshing region of each said other gear with the intermediate gear, and lands provided on the interior of the housing and cooperating with the ends of said gears to separate the suction and discharge chambers, the lands for each pair of meshing gears being disposed symmetrically with respect to the line of centers of the gears and conforming approximately to the combined profiles of the portions of the tooth spaces of the respective gears extending from the pitch circles to the root circles thereof.

3. The combination as claimed in claim 2 wherein one of the chambers is open to its meshing region of the gears to a greater arcuate extent than the remaining chambers so that pressure bias may be exerted on the intermediate gear.

MANIOUS GOTTLIEB.